Figure 1:
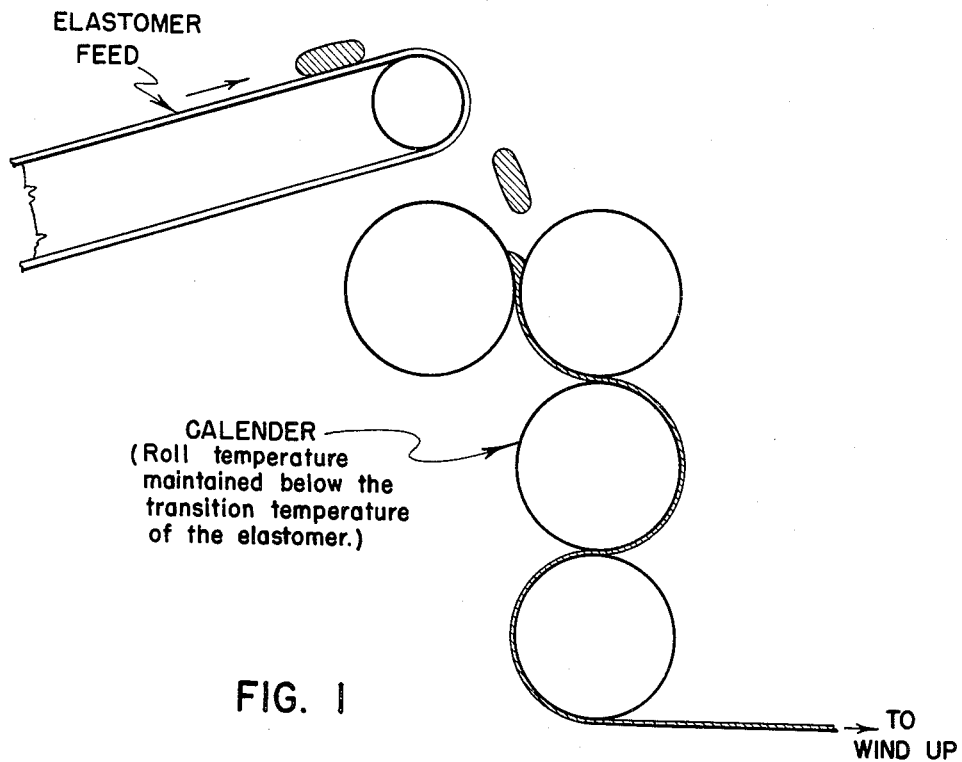

May 31, 1960

L. E. ROBB 2,938,236

CALENDERING OF COPOLYMERS OF TRIFLUOROCHLOROETHYLENE
AND VINYLIDENE

Filed July 31, 1958

INVENTOR.
LESTER E. ROBB

BY
Carpenter Abbott
Coulter & Kinney
ATTORNEYS

2,938,236
Patented May 31, 1960

1

2,938,236

**CALENDERING OF COPOLYMERS OF TRIFLUO-
ROCHLOROETHYLENE AND VINYLIDENE**

Lester E. Robb, Westfield, N.J., assignor to Minnesota
Mining and Manufacturing Company, St. Paul, Minn.,
a corporation of Delaware Filed July 31, 1958, Ser. No. 752,192

6 Claims. (Cl. 18—55)

This invention relates to, and has as an object, the calendering of copolymers of trifluorochloroethylene and vinylidene fluoride. In one aspect, the invention relates to, and has as an object, the calendering of elastomeric copolymers of trifluorochloroethylene and vinylidene fluoride. More particularly in this aspect, the invention relates to, and has as an object, the calendering of elastomeric copolymers of trifluorochloroethylene and vinylidene fluoride for the purpose of forming useful articles of this material, and apparatus suitable for carrying out such molding operation. This application is a continuation-in-part of my compending application Serial No. 512,306, filed May 31, 1955, now abandoned.

Elastomeric copolymers of trifluorochloroethylene and vinylidene fluoride are found to possess a wide variety of commercial applications, and utility. These elastomeric copolymers possess, in addition to good flexibility, resilience and elasticity, high tensile strength, hardness, and good resistance to heat. They exhibit good elastomeric properties and flexibility even when subjected to relatively low temperatures. These copolymers, furthermore, exhibit corrosion-resistance to oils, hydrocarbon fuels, and various powerful reagents. In this respect, the copolymers are unaffected, even after prolonged exposure, by hydrochloric acid, hydrofluoric acid, and strong caustic solutions, as well as concentrated sulfuric acid, fuming nitric acid, aqua regia, and other vigorous oxidizing materials. The copolymer is not affected by water or by humidity and, in general, is a highly efficient insulating material. In one of its preferred commercial applications, it is desirable to calender this copolymer in the form of sheets, films, tapes, belting and various other useful articles which can be prepared from such calendered stock, in which insulation is required in the form of a material which exhibits good elastomeric properties together with high chemical and physical stability.

Figure 1 is a diagrammatic drawing which shows a set of calender rolls as utilized in the practice of this invention to calender elastomeric copolymers of trifluorochloroethylene and vinylidene fluoride.

The elastomeric copolymers of trifluorochloroethylene and vinylidene fluoride, calendered in accordance with this invention, contain between about 20 mole percent and about 69 mole percent of trifluorochloroethylene, and the remaining major constituent being vinylidene fluoride. In general, these copolymers are prepared by copolymerizing the trifluorochloroethylene monomer with the vinylidene fluoride monomer at temperatures between about −25° C. and about 50° C. in the presence of a polymerization catalyst, either as an inorganic promoter

2 in the form of a water suspension type recipe, or as an organic peroxide promoter in mass or bulk-type polymerization. When the polymerization promoter is in the form of a water-suspension type recipe, the reaction is preferably carried out at a temperature between about 0° C. and about 35° C. When the polymerization promoter is an organic peroxide promoter in a mass polymerization system, the reaction is preferably carried out at a temperature between about −20° C. and about 0° C. Of the water-suspension recipe type catalysts, a redox catalyst system is preferred (having no emulsifier) and contains an oxidant, a reductant and a variable valence metal salt. The oxidant in the water-suspension type recipe is preferably an inorganic persulfate such as potassium persulfate, sodium persulfate or ammonium persulfate, the former being most desirable. The reductant is preferably a bisulfite, such as sodium bisulfite or potassium bisulfite, and preferably the former. The variable valence metal salt is preferably in the form of an iron salt, such as ferrous sulfate or ferrous nitrate, with ferrous sulfate being the most desirable variable valence metal salt. Of the organic peroxide promoters, halogen-substituted acetyl peroxides are employed in carrying out the copolymerization reaction in the absence of a suspension agent. Trichloroacetyl peroxide is a preferred promoter of this type. Other halogen-substituted organic peroxides suitable for carrying out the copolymerization reaction are trifluoroacetyl peroxide, difluoroacetyl peroxide, 2,4-dichlorobenzoyl peroxide, chloroacetyl peroxide, trifluorodichloropropionyl peroxide, and dichlorofluoroacetyl peroxide.

As indicated above, the finished elastomeric copolymers of trifluorochloroethylene and vinylidene fluoride contain between about 20 mole percent and about 69 mole percent trifluorochloroethylene, with the remaining major constituent being vinylidene fluoride. If the finished elastomeric copolymer contains less than about 20 mole percent of the trifluorochloroethylene monomer, the copolymer exhibits a tendency to lose the desirable properties of corrosion-resistance to strong oxidants and other powerful reagents due to the high increase in the vinylidene fluoride content. If, on the other hand, the finished copolymer contains more than about 69 mole percent of the trifluorochloroethylene monomer, the copolymer exhibits stiffness and reduced flexibility and thus loses its desirable elastomeric properties. Within this critical range, it is preferred that the finished elastomeric copolymers contain between about 25 mole percent and about 50 mole percent of the trifluorochloroethylene monomer, with the vinylidene fluoride monomer constituting the remaining major constituent.

In order to produce the aforementioned elastomeric copolymers of trifluorochloroethylene and vinylidene fluoride, a proper feed must be selected for the preparation of a finished copolymer of desired composition, having between about 20 mole percent and about 69 mole percent of trifluorochloroethylene, with the remaining major constituent being vinylidene fluoride. For this purpose, monomer reactivity ratios for trifluorochloroethylene and vinylidene fluoride are calculated in accordance with the Mayo, Lewis and Walling Equation [1], which,

[1] Reference: "Copolymerization," F. R. Mayo and Cheves Walling Chemical Reviews, vol. 46, pages 195–197.

together with the specific operating conditions for carrying out the polymerization to produce the above-mentioned finished elastomeric copolymers of trifluorochloroethylene and vinylidene fluoride, are fully described in application Serial No. 332,218, filed January 21, 1953, in the name of Albert L. Dittman, Herbert J. Passino and Wilber O. Teeters, now Patent No. 2,752,331 and is, therefore, believed to require no further elaboration insofar as the purposes of this invention are concerned. In general, however, it is found that the feed composition will comprise between about 5 mole percent and about 75 mole percent of trifluorochloroethylene with the remainder of the copolymer feed being made up of vinylidene fluoride, to produce an elastomeric copolymer comprising between about 20 mole percent and about 69 mole percent of trifluorochloroethylene. To produce an elastomeric copolymer within the preferred range, in which the trifluorochloroethylene is present in an amount between about 25 mole percent and about 70 mole percent, the feed composition will comprise between about 7 mole percent and about 40 mole percent of trifluorochloroethylene, with the remaining major constituent being vinylidene fluoride.

The aforementioned elastomeric copolymers of trifluorochloroethylene and vinylidene fluoride, with which the process of the present invention is concerned, are obtained from the polymerization reactor or bomb, in the form of chunks of rubbery polymer in admixture with water. These chunks are separated from the water, and then are separately washed with hot water to remove residual salts, followed by drying in vacuo, at a temperature between about 20° C. and about 35° C. The finished elastomeric copolymer is thus obtained as a white spongy crumb, or gum.

The aforementioned crumb of the elastomeric copolymer of trifluorochloroethylene and vinylidene fluoride has been found, through X-ray analysis, to be amorphous at temperatures as low as −40° C. Upon being subjected to stretching up to 300%, typical fibre diagrams are observed indicating susceptibility to orientation and crystal formation. The high thermal stability of the elastomeric copolymer is apparent from the fact that there is no evidence of chain scission or halogen-loss after prolonged exposure at 400° F. The specific gravity of this elastomeric gum is approximately 1.85. It is readily soluble in ketones, esters and cyclic esters; but insoluble in alcohols, and aliphatic, aromatic and chlorinated hydrocarbons. The uncured elastomer is found to have a durometer hardness of 45A–50A, and possesses an excellent storage life. Samples, exposed to strong ultraviolet light for 100 hours and stored at room temperature for more than a year, have exhibited no apparent change in properties. In carrying out the calendering of the aforementioned elastomeric copolymers of trifluorochloroethylene and vinylidene fluoride, in accordance with the process of the present invention, specific operating conditions and handling techniques are necessitated to produce finished calendered articles possessing the aforementioned desired properties.

In accordance with the process of the present invention, the elastomeric copolymer of trifluorochloroethylene and vinylidene fluoride is subjected to calendering starting with either an unvulcanized raw rubbery crumb or gum, or starting with this raw rubbery material having incorporated therein suitable vulcanizing or cross-linking agents, as more fully hereinafter described. In those instances in which it is desired to produce a finished vulcanized or cross-linked elastomeric copolymer of trifluorochloroethylene and vinylidene fluoride, suitable vulcanizing or cross-linking agents are impregnated in the raw rubbery crumb, employing such apparatus as a conventional two-roll rubber mill, having a differential speed, or a Banbury mixer, or other mixing apparatus, to produce a compounded uncured stock. In a preferred modification, the vulcanizing or cross-linking agent is impregnated in the raw rubbery crumb employing the aforementioned two-roll rubber mill having a differential speed between the rollers, to produce the aforementioned compounded uncured stock comprising a coherent high-density compounded sheet. The two-roll rubber mill is maintained at a temperature between about 125° F. and about 170° F. If so desired, high density sheets of gum thus obtained, may be cut into desired dimensions or shapes suitable for insertion into the calendering apparatus, as more fully hereinafter described.

This elastic copolymer is found to undergo a peculiar transition under external stress, such as encountered under shear, at a temperature range of about 170–190° F. This transition is characterized by the copolymeric material passing from an elastic to an inelastic or powdery state. In carrying out the calendering of the elastomeric copolymeric material of trifluorochloroethylene and vinylidene fluoride, employing either an unvulcanized raw gum, or a compounded uncured stock which contains the vulcanizing or cross-linking agent, I have discovered that proper calendering of the material cannot be carried out within this transition temperature range or at temperatures thereabove, but must be carried out at a temperature below this transition temperature range.

The aforementioned transition temperature of the elastomeric copolymer can best be described as being in the nature of a physical transition temperature range, as distinguished from any physical-chemical property. The elastomeric copolymer, when undergoing external stress, (e.g., where the curing agent is milled into the raw rubbery crumb, or where the copolymer material is passed between the nip of the calendering rolls), changes physical form at the interface at temperatures within the aforementioned transition temperature range under such stress. This change from the aforementioned elastic to an inelastic or powdery state, occurs at the surface of the molded copolymer, when temperatures are maintained within the aforementioned transition temperature range. The same phenomena are observed in milling operations when both shearing stress and the aforementioned transition temperatures, are present. The above changes in the condition of the elastomeric material are of a reversible nature. The powdery material can be banded or sheeted on the two-roll mill, at lower temperatures (e.g., 100–120° F.) to produce an elastic or rubbery gum sheet. On the other hand, a piece of rubbery gum resting in the oven within the aforementioned transition temperature range (170–190° F.), i.e., in the absence of applied stress, will not show such change. The aforementioned transition temperature range of the elastomeric copolymers of the present invention, in being described as a physical transition temperature range, will serve to distinguish this phenomenon from elastomeric materials having first and second order transition temperatures which are true thermodynamic values.

The calendering operation of the elastomeric copolymers of the present invention is carried out by running the sheeted raw rubbery polymer, with or without a vulcanizing agent being present therein, through the rolls of the calendering apparatus below the transition temperature range of the copolymer and at a temperature in the range between about 120° F. and about 170° F. Within this range, temperatures from about 130° F. up to about 170° F. are preferred. Calendering at temperatures above this range results, even where calendering appears successful, in calendered films and coatings having almost no cohesive strength. The compacting pressure which is imposed upon the elastomeric material between the calendering rolls may vary between about 200 to about 3000 lbs. per square inch. Within this range, pressures between about 1500 and about 2500 lbs. per square inch are preferred. The aforementioned temperature and pressure conditions are maintained upon the elastomeric material, and with the calendering rolls maintained at such constant speed as is effective to obtain a smooth calendered sheet of the desired thickness. In general, roll speeds between about 15 and about 30 r.p.m. are maintained, with speeds between about 20 and about 25 r.p.m. being preferred.

In view of the transition temperature range of the copolymeric material, it will be apparent why it is important, if any vulcanizing or cross-linking agents are to be added to the raw copolymeric material prior to calendering, that the vulcanizing agents should be impregnated into the rubbery crumb at a temperature below about 170° F. A satisfactory temperature range for milling the cross-linking agent into the copolymer on a ball mill has been found to be between about 125° F. and about 170° F.

As previously indicated, the calendering of the elastomeric copolymers of this invention is preferably carried out with a compounded uncured stock, containing suitable vulcanizing agents impregnated in the raw rubbery crumb. The compounding of this elastomeric material, as previously indicated, employing, e.g., a conventional two-roll rubber mill having a differential speed, is carried out by banding the raw rubbery crumb or gum on the rolls which are heated to the aforementioned temperature of about 125° F. and about 170° F. Once the rubbery material has banded, the heat of milling is sufficient to maintain the bands, and the rolls are then cooled so that scorching is avoided as the vulcanizing or curing agents are added. Unlike unsaturated hydrocarbon rubbers, this elastomeric material does not show any appreciable breakdown during the milling operation.

When starting with a compounded stock containing suitable vulcanizing agents, the formation of sheeted stock of desired thickness is accomplished between the heated calendering rolls. Vulcanizing or cross-linking is carried out outside the calendering apparatus (after the calendering operation has been completed), in suitable apparatus such as an oven, or in an autoclave under steam pressure at temperatures between about 185° F. and about 200° F., depending upon the characteristics of the vulcanizing agents employed. Inasmuch as this elastomeric copolymer is a fully saturated fluorocarbon it is not readily vulcanized by normal rubber curatives. However, this copolymer can be vulcanized or cross-linked employing organic peroxides, polyisocyanates, polyamines and isocyanate-amine combinations. The marked increase in the strength and solvent resistance of the finished molded elastomeric copolymer, after vulcanization has taken place, is found to indicate that the elastomer has undergone a chemical change producing a network or cross-linked type of structure. In Table I are shown the properties of the uncured elastomeric gum. In Table II is shown the comparison of finished vulcanized or cross-linked elastomeric copolymers of the present invention when employing various curing systems.

TABLE I

*Properties of uncured elastomer gum*

| | |
|---|---|
| Specific gravity | 1.85. |
| Fluorine content | >50%. |
| Color | Translucent off-white. |
| Tensile, p.s.i | 300–600. |
| Elongation, percent | 600–800. |
| Shore A hardness | 40–45. |
| Intrinsic viscosity, (methyl ethyl ketone 30° C.) | 2–3. |
| Solubility | Ketones, esters, ethers. |
| Storage | >two years (unchanged). |

TABLE II

*Comparison of curing systems for elastomers*

| Curative Type Stock | Peroxide | Amine | MDI | MDI | Amine |
|---|---|---|---|---|---|
| Compound: | | | | | |
| Elastomer | 100 | 100 | 100 | 100 | 100 |
| Zinc Oxide | 10 | 5 | 5 | 5 | 5 |
| Benzoyl Peroxide | 3 | | | | |
| MDI [1] | | | 5 | 5 | 5 |
| Tetraethylene Pentamine | | 6 | | | 1 |
| Trimene [2] Base | | | | 3 | |
| Press Cure: | | | | | |
| Time, hours | ½ | 1 | 1 | 1 | 1 |
| Temperature, °F | 230 | 260 | 260 | 260 | 260 |
| Oven Cure: | | | | | |
| Time, hours | 16 | 1 | 72 | 16 | 16 |
| Temperature, °F | 300 | 300 | 212 | 212 | 212 |
| Physical Properties: | | | | | |
| After Press Cure— | | | | | |
| Stress at 300% E, p.s.i | 200 | 530 | 400 | 760 | |
| Tensile Strength, p.s.i | 350 | 1,280 | 530 | 1,590 | |
| Percent Elongation | 750 | 600 | 350 | 400 | |
| Hardness, Shore A | 40 | 48 | 53 | 50 | |
| After Oven Cure— | | | | | |
| Stress at 300% E, p.s.i | 530 | 1,020 | 590 | 1,170 | 630 |
| Tensile Strength, p.s.i | 350 | 1,620 | 800 | 1,460 | 1,250 |
| Percent Elongation | 500 | 450 | 320 | 400 | 580 |
| Hardness, Shore A | 47 | 55 | 61 | 58 | 60 |
| Tear Strength, p.p.i | | | 43 | 53 | |

[1] Methylene bis (4-phenyl isocyanate).
[2] Cyclic secondary amine (Naugatuck Chemical Company).

Of the organic peroxides which have been employed to vulcanize or cross-link the raw elastomeric copolymer, benzoyl peroxide has been found to be the most convenient curing agent. It is easily dispersed in the rubbery material and is found to react efficiently at the aforementioned calendering temperatures. The optimum range of the benzoyl peroxide concentration is between about 1.5 to about 3.0 parts per 100 parts of raw elastomeric copolymer, by weight. Metallic oxides, such as those of zinc, calcium and lead, and lead salts such as dibasic lead phosphite, tribasic lead maleate, and tribasic lead sulfate may be employed as stabilizers or accelerators in the benzoyl peroxide curing treatment to improve and maintain the physical properties of the vulcanizate. At the aforementioned peroxide levels the optimum concentrations of both metal oxides and lead salts are 5 to 10 parts per 100 parts of elastomeric copolymer.

Extensive experiments with elastomeric copolymer stocks when compounded with zinc oxide, shows that these stocks possess high initial tensile strength and good aging properties at both normal and elevated temperatures. Magnesium and calcium oxides have also been found to impart high tensile strength but tend to increase the water absorption characteristics of the elastomeric material. Lead oxide stocks are characterized by low moduli and high elongations. The effects of incorporating various metal oxides and lead salts in benzoyl peroxide compounds are shown in Table III.

To preclude blowing or out-gassing in calendered articles greater than about 75 mils thick, it is preferred to lower the peroxide concentration to about 1.5 parts per 100 parts of elastomeric copolymer. This reduction in the quantity of peroxide employed does not appreciably change the physical properties of the stock. An example of such a compound is one containing 10 parts of zinc oxide, 10 parts of dibasic lead phosphite, and 1.5 parts of benzoyl peroxide per 100 parts of raw elastomeric gum. The peroxide stocks are smooth, pliable, soft, easily processed and flow well between the calender rolls. These stocks, when subsequently cured, have excellent physical properties and possess maximum resistance to oxidative chemical attack.

TABLE III

*Effect of metal oxide variation and basic lead salts on peroxide cured elastomer*

| Run Number | 1 | 2 | 3 | 4 | 5 | 6 |
|---|---|---|---|---|---|---|
| Compound: | | | | | | |
| Elastomer | 100 | 100 | 100 | 100 | 100 | 100 |
| Zinc Oxide | 10 | 10 | | | 10 | 10 |
| Litharge | | | 10 | | | |
| Calcium Oxide | | | | 10 | | |
| Benzoyl Peroxide | 3 | 3 | 3 | 3 | 3 | 3 |
| Dibasic Lead Phosphite | | 10 | 10 | 10 | | |
| Tribasic Lead Phosphite | | | | | 10 | |
| Tribasic Lead Maleate | | | | | | 10 |
| Press Cure: | | | | | | |
| Time, Hours | ½ | ½ | ½ | ½ | ½ | ½ |
| Temperature, °F | 230 | 230 | 230 | 230 | 230 | 230 |
| Oven Cure: | | | | | | |
| Time, Hours | 16 | 16 | 16 | 16 | 16 | 16 |
| Temperature, °F | 300 | 300 | 300 | 300 | 300 | 300 |
| Physical Properties: | | | | | | |
| After Press Cure— | | | | | | |
| Stress at 300% E, p.s.i | 200 | 450 | 340 | 380 | 505 | 375 |
| Tensile Strength, p.s.i | 350 | 920 | 640 | 715 | 1,040 | 690 |
| Percent Elongation | 750 | 450 | 600 | 550 | 450 | 500 |
| Hardness, Shore A | 40 | 45 | 42 | 45 | 47 | 42 |
| After Oven Cure— | | | | | | |
| Stress at 300% E, p.s.i | 530 | 660 | 435 | 760 | 685 | 490 |
| Tensile Strength, p.s.i | 1,350 | 2,500 | 2,200 | 2,180 | 2,120 | 2,400 |
| Percent Elongation | 500 | 500 | 650 | 475 | 500 | 550 |
| Hardness, Shore A | 47 | 51 | 48 | 47 | 52 | 47 |
| Tear Strength, p.p.i | | 123 | 141 | | | |

Of the amines which have been employed to vulcanize the raw elastomeric copolymer, basic primary and secondary aliphatic polyamines have been found most effective. In this respect, triethylene tetramine, tetraethylene pentamine, trimene base and hexamethylene diamine impart the highest tensile strength. The optimum amine concentrations are 1½ to 6 parts of amine per 100 parts of raw elastomeric gum. The tensile strength in the amine stocks vary directly with the amine concentration; however, high amine loadings result in stocks which tend to become short after prolonged high-temperature aging.

The amine stocks tend to scorch when processed on a hot conventional two-roll rubber mill; however, scorching can be controlled by introducing the amine in the form of an amine salt, such as hexamethylene diamine diacetate. The amine stocks are capable of being cured in a shorter period of time than other raw elastomeric stocks of the copolymers of the present invention. The recommended curing cycle is one hour in the press at about 260° F., followed by a one-hour after-cure in the oven at 300° F. The primary advantage of amine stocks is that, unlike the aforementioned peroxide stocks, they can be plasticized effectively with commercial plasticizers. It has been found that these plasticized amine stocks are more resilient and have better low temperature properties than other raw elastomeric stocks of the copolymers of the present invention.

With respect to the polyisocyanates that may be employed as vulcanizing agents incorporated in the raw elastomeric copolymers of the present invention, such compounds may be employed as methylene bis(4-phenyl isocyanate), supra, toluene 2,4-diisocyanate, and methane tri-(4-phenyl isocyanate). Metal oxides are employed to accelerate this type of cure. Concentrations of 5 to 10 parts of isocyanate and 5 to 10 parts of metal oxide per 100 parts of raw elastomeric copolymer are preferred.

The subsequent vulcanization treatment of these stocks, following the calendering operation is preferably carried out at about 212° F. for a period of about 16 to 72 hours. Under these conditions, the initial tensile strength of the isocyanate vulcanizates are low but tend to improve on aging. In general, the isocyanate cured stocks are shorter, stiffer and less acid-resistant than the peroxide cured stocks. The isocyanate stocks have been found to be more resistant to low hydrocarbon oils than the peroxide cured stocks. To improve the rate and extent of isocyanate vulcanization, 1 to 3 parts of the various amines, such as trimene base, and tetraethylene pentamine, may be added to stocks which contain 5 parts of polyisocyanate. Although these stocks, like the isocyanate stocks, are stiffer and less acid-resistant, they are more resistant to hydrocarbon oils than peroxide-cured vulcanizates.

As previously indicated, the calendered vulcanizates of the elastomeric copolymers of the present invention possess high tensile strength and good extensibility. These properties, however, may be improved by the incorporation of various fillers. The effects of adding two such fillers, viz., precipitated silica and silicone coated silica, to peroxide and M.D.I.-amine compounds are shown in Table IV.

TABLE IV

*Comparison between filled and unfilled elastomer vulcanizates*

| Run Number | 1 | 2 | 3 | 4 | 5 | 6 |
|---|---|---|---|---|---|---|
| Compound: | | | | | | |
| Elastomer | 100 | 100 | 100 | 100 | 100 | 100 |
| Zinc Oxide | 5 | 5 | 5 | 10 | 10 | 10 |
| MDI | 5 | 5 | 5 | | | |
| Tetraethylene Tetramine | 1 | 1 | 1 | | | |
| Benzoyl Peroxide | | | | 3 | 3 | 3 |
| Dibasic Lead Phosphite | | | | 10 | 10 | 10 |
| Precipitated Silica | | 20 | | | 20 | |
| Silicone Coated Precipitated Silica | | | 20 | | | 20 |
| Press Cure: | | | | | | |
| Time, hours | 1 | 1 | 1 | ½ | ½ | ½ |
| Temperature, °F | 260 | 260 | 260 | 230 | 230 | 230 |
| Oven Cure: | | | | | | |
| Time, hours | 16 | 16 | 16 | 16 | 16 | 16 |
| Temperature, °F | 212 | 212 | 212 | 300 | 300 | 300 |
| Physical Properties: | | | | | | |
| Stress at 300% E, p.s.i | 1,350 | 2,200 | 2,500 | 660 | 1,230 | 1,620 |
| Tensile Strength, p.s.i | 1,700 | 2,400 | 2,500 | 2,000 | 1,880 | 3,600 |
| Percent Elongation | 300 | 330 | 310 | 500 | 525 | 450 |
| Hardness, Shore A | 55 | 78 | 77 | 48 | 70 | 73 |
| Tear Strength, p.p.i | | 135 | 160 | 123 | | 204 |

In general, precipitated silicas increase the modulus and hardness without appreciably affecting the ultimate tensile strength or elongation of the peroxide-cured stocks. The same fillers, e.g., precipitated silica coated with a linear silicone polymer markedly increases both the tensile strength and tear-strength of the peroxide vulcanizates without changing elongation characteristics. It is believed that this high reinforcement results from cross-linking the silicone polymer to the fluorocarbon polymer.

The physical properties observed for a group of filled peroxide stocks are shown in Table V.

TABLE V

*Filled elastomer*

| Run Number | 1 | 2 | 3 | 4 | 5 |
|---|---|---|---|---|---|
| Elastomer | 100 | 100 | 100 | 100 | 100 |
| Zinc Oxide | 10 | 10 | 10 | 10 | 10 |
| Dibasic Lead Phosphite | 10 | 10 | 10 | 10 | 10 |
| Benzoyl Peroxide | 3 | 3 | 3 | 3 | 3 |
| Precipitated Silica | 20 | | | | |
| Silicone Coated Precipitated Silica | | 20 | | | |
| Refined Silica | | | 20 | | |
| Zirconium Silicate | | | | 20 | |
| Carbon Black | | | | | 20 |
| Cure: Press—½ hr./230° F.; Oven—16 hr./300° F. | | | | | |
| Stress at 300%, p.s.i | 1,230 | 1,620 | 1,200 | 800 | 290 |
| Tensile, p.s.i | 1,880 | 3,600 | 2,700 | 2,510 | 420 |
| Elongation, Percent | 525 | 450 | 660 | 700 | 450 |
| Shore A Hardness | 70 | 73 | 75 | 60 | 69 |

In some instances, it is desirable to obtain increased mechanical strength in the calendered article. In such instances, the desired improved mechanical strength can be obtained by reinforcement of the calendered article with a fabric being employed as a backing. The composition and weave of the fabric are important factors which will govern the mechanical quality of the composite structure. Accordingly, the elastomeric copolymers of the present invention can, for example, be successfully calendered into sheets having a fabric reinforcement. Such reinforced sheets can be further fabricated into fuel cells, belts, and molded diaphragms.

It should be noted that the operation in which the vulcanizing agents are impregnated into the raw rubbery crumb employing a two-roll differential speed rubber mill, is a batchwise operation in which the vulcanizing agents (and filler materials, if so desired) are added to the rubber in the nip of the rolls in a series of passes, until it is apparent that thorough admixture with uniform distribution of these materials has been obtained. In its most elementary form, the calendering operation, on the other hand, is a single-pass operation between a single set of rolls of constant speed. However, in this respect, it should be noted that a series of calendering sets of rolls may be employed, as for example, in skim-coating, in which a fabric or other material may be impregnated with the compounded partially cured stock after the latter has gone through at least one set of rolls. Where friction coating of the various materials is desired to be obtained, the aforementioned additional sets of calendering rolls may also have differential speeds in order to obtain better penetration of the compounded stock into the desired material. In certain instances, it is also within the scope of the present process to affect the above-mentioned calendering operation in which fabrics are employed having an adhesive coating.

An example of the aforementioned technique is illustrated by the fabrication of calendered peroxide-cured stocks in producing sheetings of the elastomeric copolymer of the present invention. The peroxide-type vulcanizing agent is impregnated into the raw rubbery gum on a two-roll rubber mill, employing a temperature of about 140° F. This raw uncured elastomer stock, containing the peroxide vulcanizing agent, comprises trifluorochloroethylene and vinylidene fluoride, each present in an amount of approximately 50 mole percent. After the vulcanizing agent has been impregnated into the raw rubbery stock, the compounded stock is removed and subjected to the calendering operation. The calendering is obtained employing a multiple roll apparatus on a 21 x 36 inch inverted L calender as shown in Figure 1 to produce sheets having thicknesses from 15 to 35 mils. These calendering rolls are operated at a temperature of about 160° F. and a pressure of about 5000 pounds per square inch.

Another example of the process of the present invention is illustrated by first forming a calendered sheet approximately 30 mils in thickness, from a stock containing a polyisocyanate curative and metal oxide accelerator. Hoses were built up from such sheets by wrapping them around a mandrel with tetrahydrofuran solvent between the layers. Curing was attained by tightly wrapping the hose sections with fabric and subjecting the assembly to open steam, at 15 pounds per square inch, for a period of 30 minutes. It was found that the individual sheets of rubber were so tightly bonded that it was difficult to distinguish the interfaces between concentric layers.

By following the procedures set forth above, it has been found possible to calender the elastomeric copolymeric materials of the present invention into a variety of useful articles, which include sheets, films, tapes and belting, either unsupported or reinforced by many types of fabric.

Since certain changes may be made in carrying out the above method, and in the apparatus employed, without departing from the scope of the invention, it is intended that all matter contained in the above description is to be interpreted as illustrative and not necessarily in a limiting sense.

What is claimed as new is:

1. A method for calendering a material comprising an elastomeric copolymer of trifluorochloroethylene and vinylidene fluoride which copolymer undergoes a transition from an elastomeric state to a non-elastic powdery state at about 170–190° F., said method comprising: introducing said material between a set of calendering rolls; passing said material through said calendering rolls while maintaining a temperature thereon at least about 130° F. but below the transition temperature of said copolymer; and withdrawing the thus-formed calendered material from said calendering rolls.

2. A method for calendering a material comprising an elastomeric copolymer of trifluorochloroethylene and vinylidene fluoride which copolymer undergoes a transition from an elastomeric state to a non-elastic powdery state at about 170–190° F., said method comprising: introducing said material between a set of calendering rolls; passing said material through said calendering rolls while maintaining a temperature thereon at least about 120° F. but below the transition temperature of said copolymer and at a pressure between about 200 and about 3000 pounds per square inch; and withdrawing the thus-formed calendered material from said calendering rolls.

3. A method for calendering a material comprising an elastomeric copolymer of trifluorochloroethylene and vinylidene fluoride which copolymer undergoes a transition from an elastomeric state to a non-elastic powdery state at about 170–190° F., said method comprising: introducing said material between a set of calendering rolls; passing said material through said calendering rolls while maintaining a temperature thereon at least about 130° F. but below the transition temperature of said copolymer and a pressure between about 1500 and about 2500 pounds per square inch; and withdrawing the thus-formed calendered material from said calendering rolls.

4. The method of claim 1 wherein said copolymer contains a cross-linking agent.

5. The method of claim 2 wherein said copolymer contains a cross-linking agent.

6. The method of claim 3 wherein said copolymer contains a cross-linking agent.

References Cited in the file of this patent

UNITED STATES PATENTS

| | | |
|---|---|---|
| 2,432,242 | Leekley | Dec. 9, 1947 |
| 2,535,034 | Billmeyer | Dec. 26, 1950 |
| 2,689,241 | Dittman et al. | Sept. 14, 1954 |

UNITED STATES PATENT OFFICE
CERTIFICATE OF CORRECTION

Patent No. 2,938,236                    May 31, 1960

Lester E. Robb

It is hereby certified that error appears in the printed specification of the above numbered patent requiring correction and that the said Letters Patent should read as corrected below.

Column 3, line 20, for "70 mole" read -- 50 mole --.

Signed and sealed this 1st day of November 1960.

(SEAL)
Attest:

KARL H. AXLINE                         ROBERT C. WATSON
Attesting Officer                     Commissioner of Patents